United States Patent
Twitchell

(10) Patent No.: US 6,854,743 B2
(45) Date of Patent: Feb. 15, 2005

(54) ARTICULATED STEERING SLED

(76) Inventor: Owen Atkinson Casto Twitchell, 715 NW. 67th St., Redmond, OR (US) 97756

(*) Notice: Subject to any disclaimer, the term of this patent is extended or adjusted under 35 U.S.C. 154(b) by 0 days.

(21) Appl. No.: 10/405,597

(22) Filed: Apr. 1, 2003

(65) Prior Publication Data

US 2004/0195787 A1 Oct. 7, 2004

(51) Int. Cl.$^7$ .......................... B62B 13/00; B62B 13/18
(52) U.S. Cl. .............................. 280/22; 280/16; 280/8; 280/21.1
(58) Field of Search .......................... 280/22, 21.1, 8, 280/18, 13, 16, 28, 845, 12.1, 14.1, 14, 15, 17, 22.1, 23.1, 28.11, 18.15, 28.17, 28.5, 28.8, 9, 10, 7.12; 180/182

(56) References Cited

U.S. PATENT DOCUMENTS

| | | | |
|---|---|---|---|
| 1,160,569 A | | 11/1915 | Bourdon et al. |
| 1,756,303 A | * | 4/1930 | Phillips ........................ 280/22 |
| 1,820,044 A | * | 8/1931 | Monroe ........................ 280/22 |
| 2,006,328 A | * | 6/1935 | Scholtes ........................ 280/22 |
| 2,006,330 A | * | 6/1935 | Scholtes ........................ 280/22 |
| 2,098,880 A | * | 11/1937 | Reed ........................ 280/22 |
| 2,292,130 A | | 8/1942 | Krauss |
| 2,520,861 A | * | 8/1950 | Stone ........................ 403/229 |
| 2,547,210 A | * | 4/1951 | Holbrook ................... 280/22.1 |
| 2,589,764 A | | 3/1952 | Basso |
| 2,620,199 A | | 12/1952 | Maly et al. |
| 3,528,674 A | * | 9/1970 | Schwarz ................... 280/22.1 |
| 3,734,523 A | * | 5/1973 | Field ........................... 280/16 |
| 4,036,506 A | | 7/1977 | Scheib |
| 4,159,119 A | * | 6/1979 | Smith ............................. 280/9 |
| 4,219,207 A | | 8/1980 | Muir et al. |
| 4,334,691 A | | 6/1982 | Scheib |
| 4,542,908 A | * | 9/1985 | Muyskens ................. 280/22.1 |
| 4,796,902 A | * | 1/1989 | Capra ........................... 280/16 |
| 5,000,466 A | | 3/1991 | Den Hartog |
| 5,573,257 A | | 11/1996 | Olivieri |
| 5,667,229 A | * | 9/1997 | Wenger ........................ 280/22 |
| 6,042,122 A | * | 3/2000 | Mohr ............................. 280/9 |
| 6,068,269 A | | 5/2000 | Bergeron |
| 6,349,950 B1 | * | 2/2002 | Levy et al. .................... 280/22 |

* cited by examiner

*Primary Examiner*—Christopher P. Ellis
*Assistant Examiner*—G B Klebe
(74) *Attorney, Agent, or Firm*—Glenn Brown

(57) ABSTRACT

A sled having left and right runners pivotably attached to front, center and rear cross members. A central longitudinal member is axially pivotably attached to the front and rear cross members. When rotated, the central longitudinal member moves the central cross member right and left, causing the runners to bend and the sled to turn. The front and rear cross members are free to move toward and away from each other to facilitate the smooth deflection of the runners.

15 Claims, 8 Drawing Sheets

ARTICULATED STEERING SLED

BACKGROUND OF INVENTION

This invention relates to snow sleds, specifically to a sled with improved performance on snow and dry land.

DESCRIPTION OF PRIOR ART

Since ancient times, people have been using sleds to transport themselves and materials over snow and land. While their motivation for doing this was probably originally for practical purposes of transportation, those motives have evolved over the last several hundred years to include sledding for recreational purpose also.

Two general sled types have been developed to varying degrees over the years. They are the flat bottomed planing sled and the runner sled. Flat bottomed planing sleds provide a larger surface to contact the snow and help the sled work better in deeper unpacked snow by allowing the sled to ride on top of (or plane on) the snow. Flat-bottomed planing sleds however are difficult to control and have a tendency to slide sideways when going across a hill.

Runner sleds use thin runners to cut into the snow and work better on compacted snow or ice. They are more controllable than flat bottomed planing sleds and tend to track better across hills, but are almost useless in soft unpacked snow.

Many different designs have surfaced for the flat bottomed planing sled most of which tried to improve the tracking of the sled by including ridges running the length of the bottom of the sled. These were largely ineffective because the ridges weren't high enough to have any real effect. When the ridges were made higher the sled became in effect a runner sled and lost its advantage in soft unpacked snow. Another way of controlling flat bottomed planing sleds that has been developed is the use of devices to induce drag on either side of the flat bottom planing sled. This attempt at changing the direction of flat bottom planing sled has marginal effect and results mostly in slowing the sled down and causing the sled to slide out and continue in the same direction sideways.

Numerous designs for runner sleds exist today as well. Most focus on various ways of flexing the runners in order to change the direction of the sled. Other runner sled designs incorporate the use of skis as runners. Runner sleds that use skis as runners do offer some limited planing ability but fail to turn well. Several elaborate designs for linkages to try and make runner sleds that use skis turn have been patented, for example, U.S. Pat. No. 4,334,691 to Scheib et. al. This design (like many others) uses a fairly complicated system to get the sled's ski runners to tilt on edge. However simply tilting a ski on its edge will not cause it to turn. A ski must also flex and reverse its camber to turn. None of these designs allow this and therefore have limited ability to turn a sled. Another design aimed at making a runner sled that uses skis to turn is described by Scheib in U.S. Pat. No. 4,036,506. This design effectively brakes the skis into two pieces with leading portion of the skis being mounted on an apparatus that allows that portion of the skis to be pointed in the direction that the sled is intended to go. The fact that only a short length of the skis actually changes position while the larger trailing piece of the skis remains straight limits the design's success in turning the sled.

Runner sled designs that work on the principle of making the sled turn by flexing the runners have had limited success because they only allow the a small portion of the runner to flex. An example of this can be found in U.S. Pat. No. 2,292,130 to Krauss et. al. In this design the sled's runners flex but are attached to the sled by broad pieces that do not rotate with the flex of the runner. This leaves only a small portion of the runner that is between the attachment points to flex, and also creates portions of the runner that remain straight. There is also no provision in the design for the fact that as the runners flex the longitudinal distance between the runner attachment points decreases i.e., the cross members cannot move closer together as the runner tries to flex. These design flaws greatly reduce the runners' flex, thus reducing equally the ability of the sled to change direction. Another example of a flexible runner sled design that suffers from the same flaws can be found in U.S. Pat. No. 5,573,257 to Olivieri et. al. This design, while much more complicated, fails for precisely the same reasons as that of Krauss.

In summary, these various attempts at designing a sled that is steerable and controllable have limited success in achieving that goal. This reduces their safety and utility in general.

(A) Mechanisms designed to make flat bottomed planing sleds steerable do not work on packed snow and ice.

(B) Runner sled designs that use skis as runners fail to understand and execute the way skis turn.

(C) Runner sleds that employ a design that allows the runners to flex in order steer the sled fail to solve the problem of allowing the runner to pivot at the point where it is attached to the sled. This limits the flex of the runners and thereby limits the steerability.

(D) Existing runner sled designs effectiveness in steering the sled is very limited because they fail to address the fact that as a runner flexes its length decreases.

(E) Few if any of the designs allow the sled to be adapted to use on dry land.

SUMMARY OF THE INVENTION

Currently sleds employ a flat bottomed or runner design. None of these offer much ability to steer and control the sled. They also tend to function in very specific snow conditions and are not adaptable to use on dry land. All this greatly reduces there usefulness.

OBJECTS AND ADVANTAGES

My design, therefore, has the following objects and advantages:

(A) Runners pivotally attach to the sled allowing greater and more even flex in the runners. This greatly improves the sled's ability to turn.

(B) Front and rear cross members to which the runners are attached move closer together and further apart as runner length increases and decreases when it flexes. Again this gives the runners more even flex and improves the sled's ability to turn.

(C) Wide ski tips are mounted on the tips of the runners to help the sled ride on top of soft unpacked snow.

(D) A wide flat board is mounted on the bottom of the sled between the runners and runs the length of the sled, allowing it to ride (or plane) on top of soft unpacked snow and letting the runners act like rudders in soft unpacked snow.

(E) The flat board mounted on the bottom of the sled is hour glass shaped to accommodate the flex of the runners and to mimic the shape of modern skis. This helps the sled turn in soft unpacked snow.

(F) This is truly a highbred design that combines the positive attributes of runner and flat bottomed sleds, and which allow it to operate on packed snow, ice, and unpacked soft snow.

(G) The sled is steered by leaning side to side and forward and backward making it extremely easy to control.

(H) Wheels attach easily to runners making it function equally well on dry land.

(I) Neutral position of seat can be adjusted to accommodate people with disabilities.

(J) Using two ropes from attach to the seat and run through pulleys attached to the frame the sled can be tethered and steered from in front or behind. This gives it the ability to be used as a cargo sled.

(K) Using different seat configurations the sled can be ridden face or feet first.

(L) The seat is mounted below the lengthwise pivot point lowering the center of gravity and reducing high speed steering oscillations.

(M) Entire sled is simple, easy to use and above all functions well enough to carve up intermediate rated ski runs safely on packed snow, ice, or soft unpacked snow.

Figure 1:
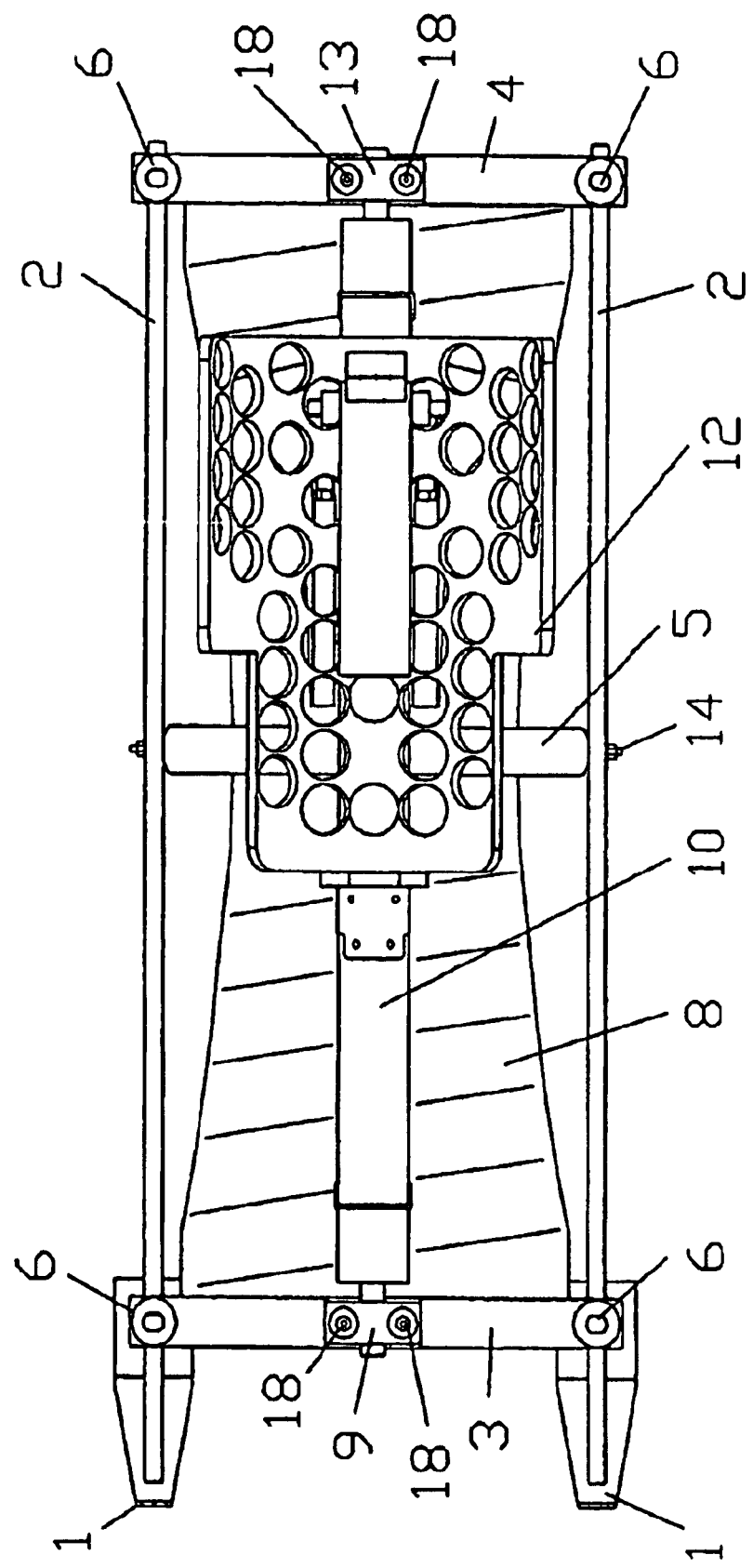
FIG. 1 is a top view of articulated steering sled.

| Reference Numerals in Drawings | |
|---|---|
| 1. | Planing tip |
| 2. | Runner |
| 3. | Front cross member |
| 4. | Rear cross member |
| 5. | Intermediate cross member |
| 6. | Runner pivot |
| 7. | Runner pivot hard point |
| 8. | Planing board |
| 9. | Front Tower |
| 10. | Longitudinal axle |
| 11. | Toggle arm |
| 12. | Seat |
| 13. | Rear Tower |
| 14. | Cross member anchor bolt |
| 15. | Toggle trunk |
| 16. | Toggle wheel |
| 17. | Toggle wheel axle |
| 18. | Tower bolts |
| 19. | Seat anchor bolts |
| 20. | Runner wheels |

DESCRIPTION OF INVENTION

Figure 2:
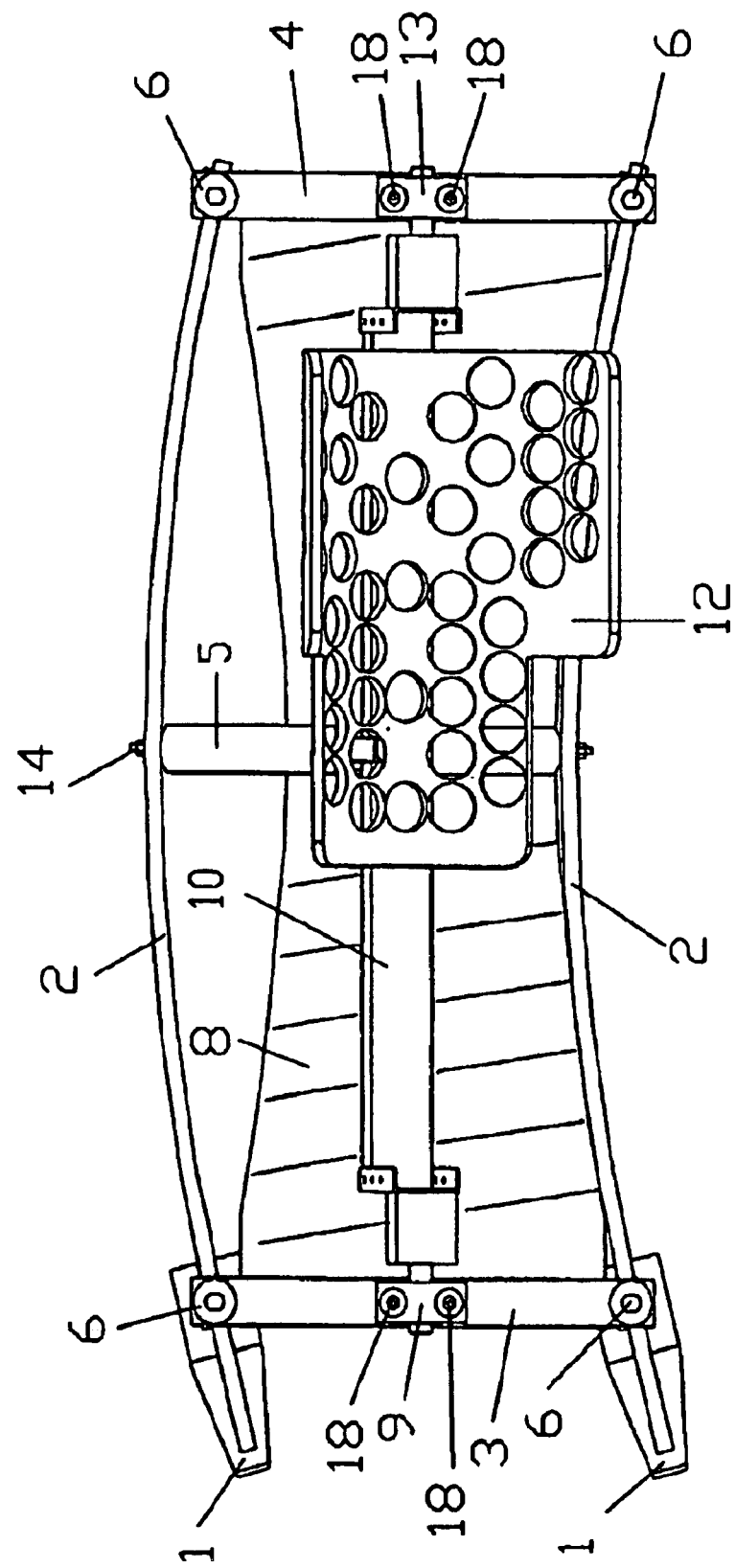
FIG. 2 is a top view of articulated steering sled with seat tilted and runners completely articulated.
Figure 3:
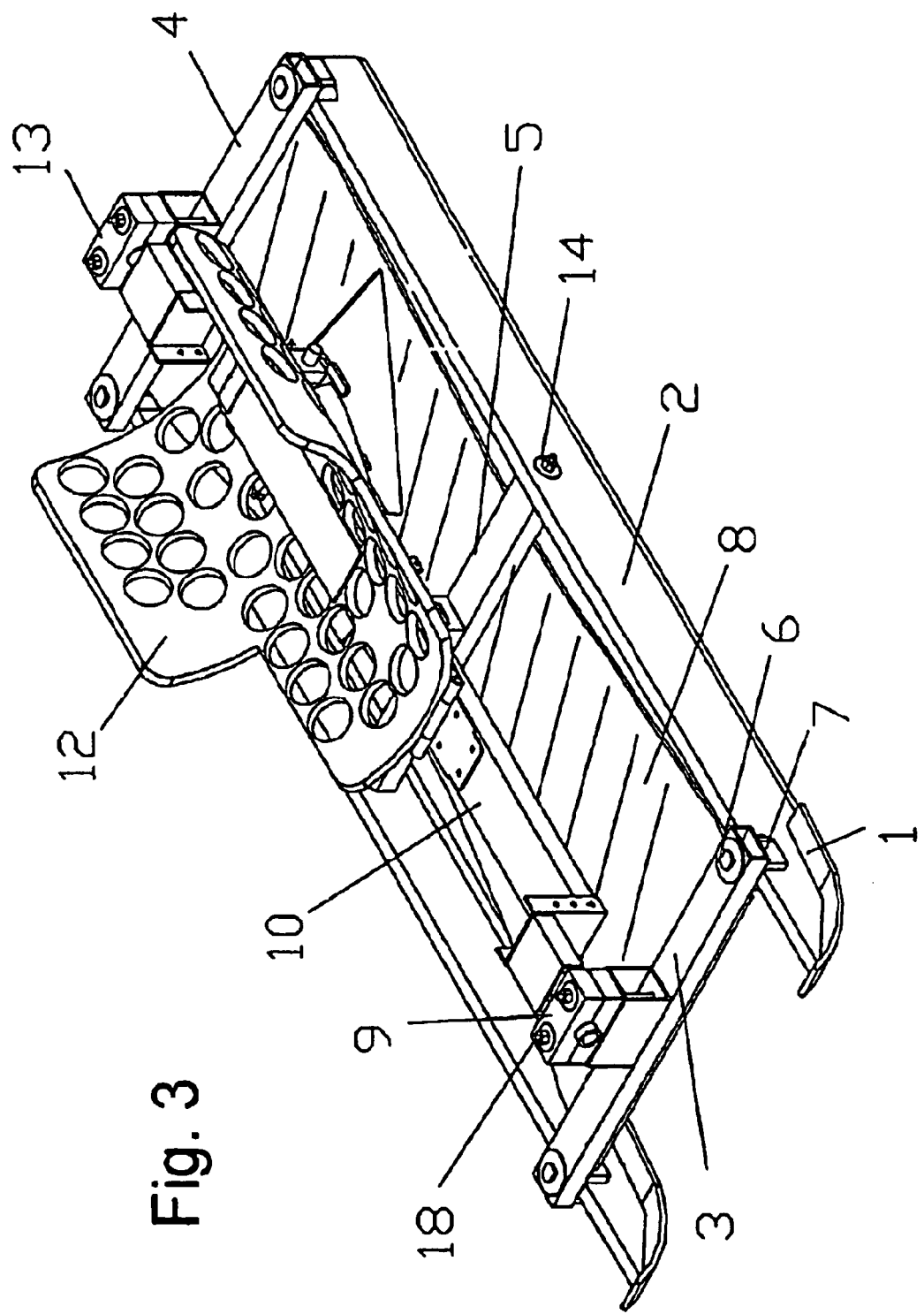
FIG. 3 is a front and side perspective of articulated steering sled.
Figure 4:
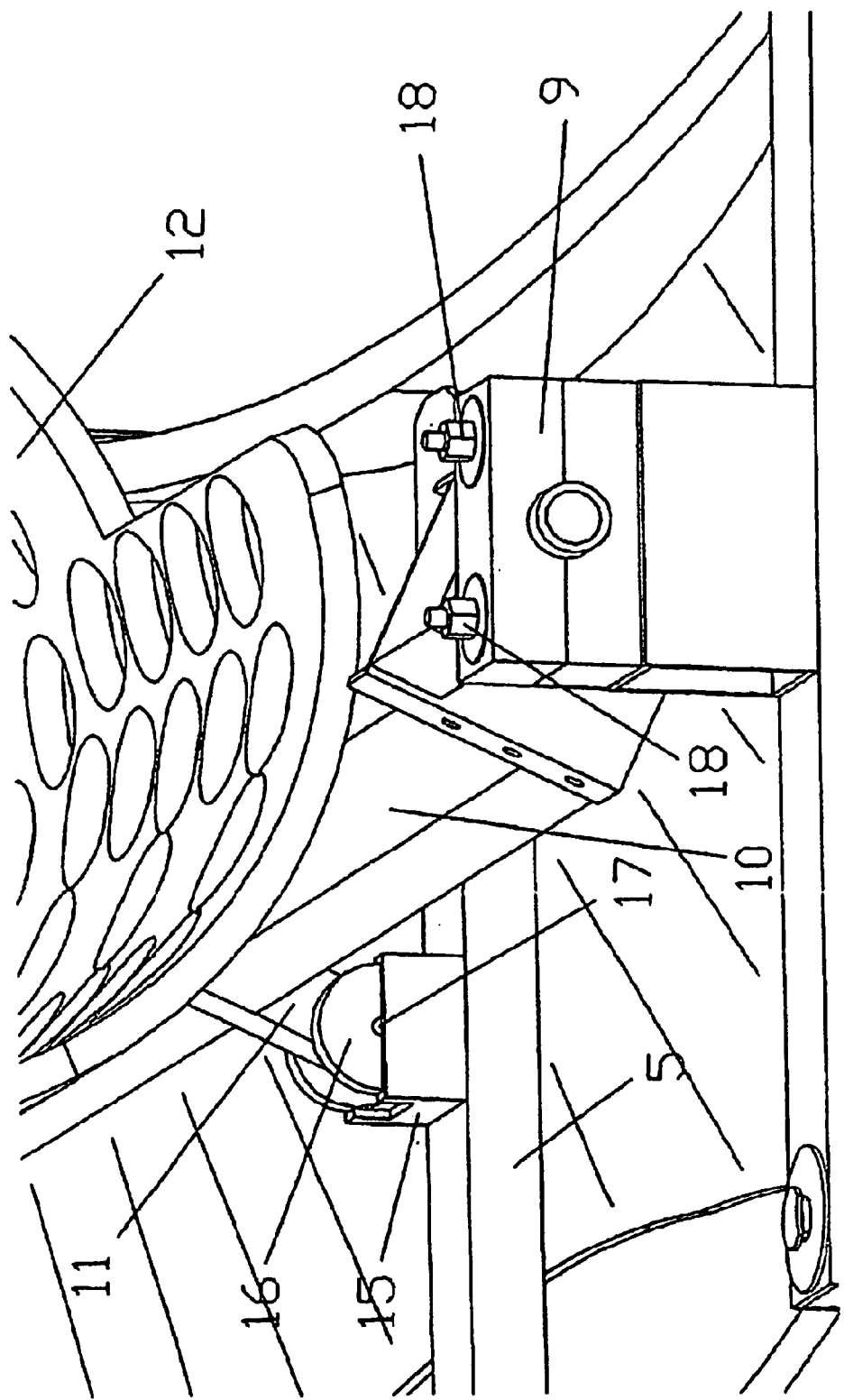
FIG. 4 is a close-up front view of toggle steering system.
Figure 6:
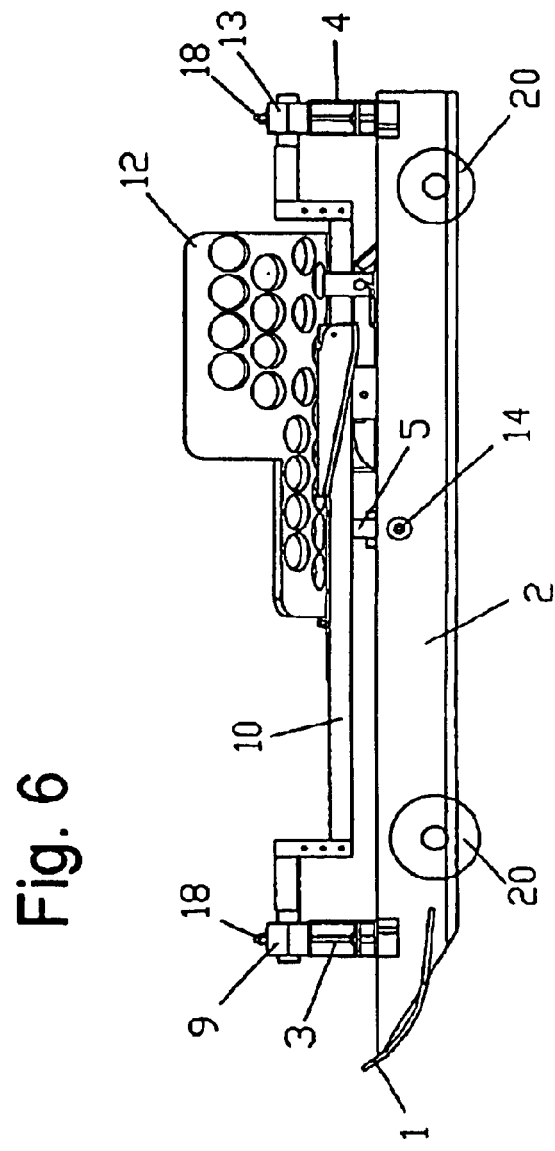
FIG. 6 is a side view of articulated steering sled with wheels attached to runners.
Figure 7:
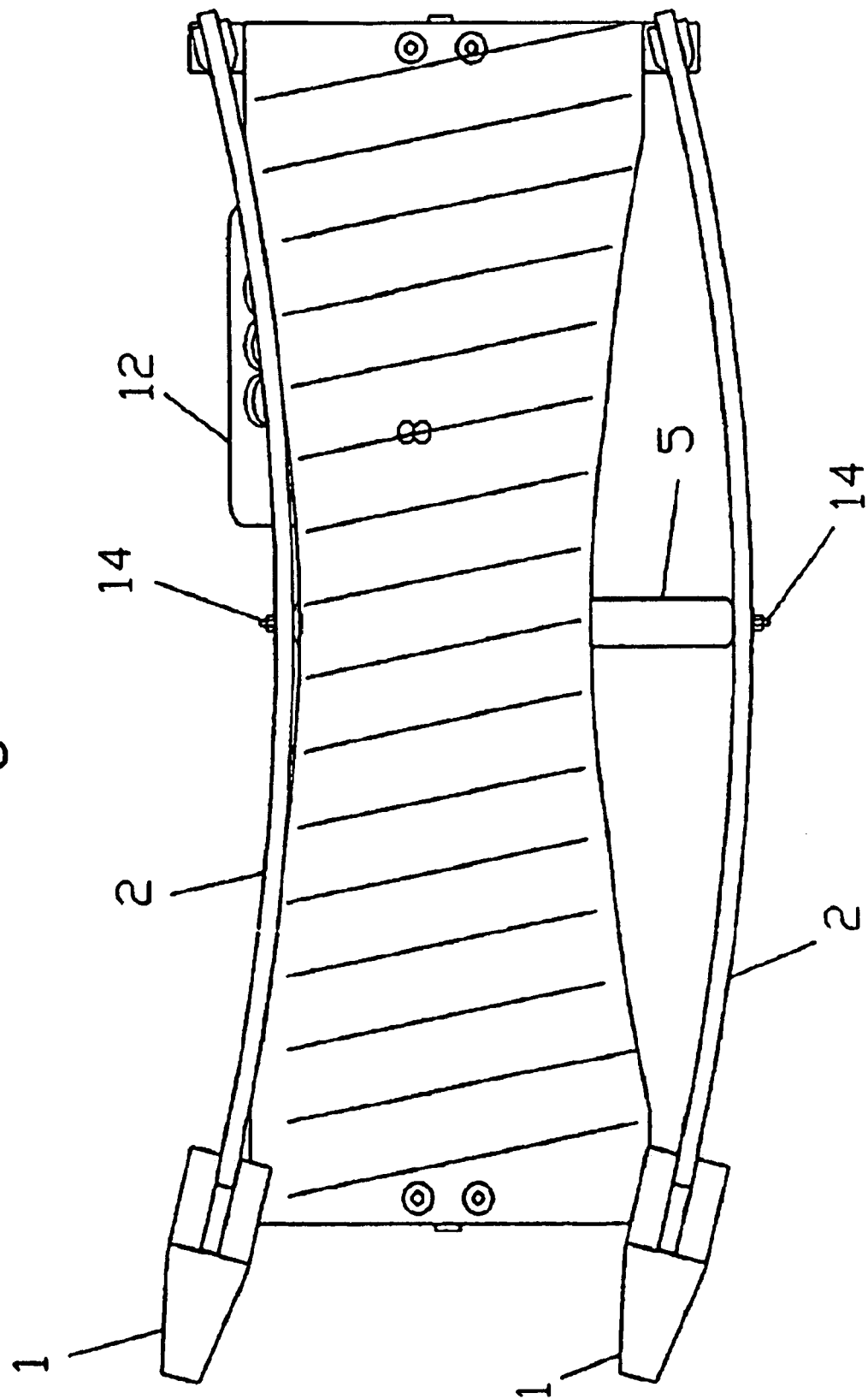
FIG. 7 is a bottom view of articulated steering sled with runners completely articulated.

FIG. 3 shows a side and front perspective of the articulated steering sled. The sled has six main components. They are the runners 2, planing board or bottom plate 8, cross members 3, 4, 5, longitudinal axle 10, toggle mechanism 11, 15, 16, 17, and seat 12. A set of two runners 2 is made of flexible and durable material. The runners are preferably made from thermoplastic, but any other suitable material can be used. Runners 2 are connected to front cross member 3 and rear cross member 4 at runner pivot hard points 7 by runner pivots 6. A set of planing tips 1 is attached to leading edges of runners 2. A intermediate cross member 5 containing toggle trunk 15 spans between runners 2 and is attached by cross member anchor bolts 14. A central longitudinal member 10 spans between and protrudes through front journal 9 and rear journal 13. The front and rear portions of the central longitudinal member are elevationally offset from the middle portion, as clearly shown in FIG. 6. A seat 12 is attached to the top of longitudinal axle 10. FIG. 4 shows a close up front view of the articulated steering system. A toggle 11 is attached to underside of longitudinal axle 10 and rests in toggle trunk 15. Toggle trunk 15 is attached to intermediate cross member 5. Toggle wheels 16 are attached to toggle 11 by toggle axle 17. FIG. 2 shows a top view of the sled with seat 12 tilted to the side and runners 2 completely articulated. FIG. 7 is a bottom view of sled showing a planing board 8 spanning between front cross member 3 and rear cross member 4. Planing board 8 is attached to front cross member 3 and rear cross member 4 by tower bolts 18. FIG. 6 is a side view of sled with runner wheels 20 attached to runners 2.

Operation of Invention

Figure 5:
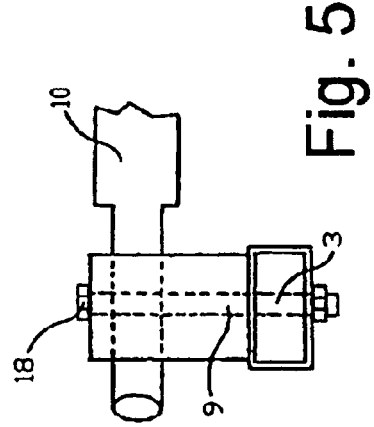
FIG. 5 is a close-up side view of front tower and longitudinal axle.
Figure 8:
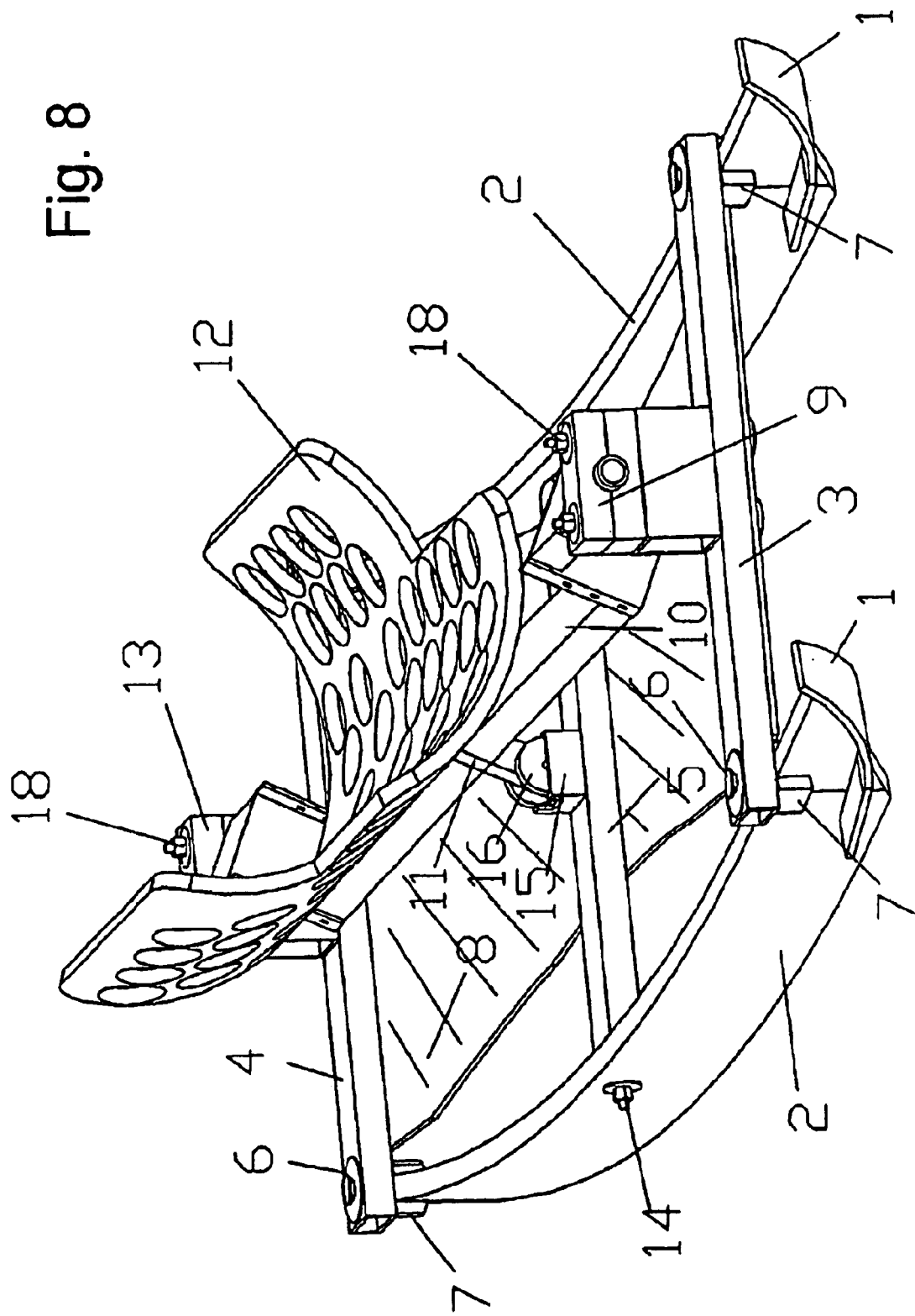
FIG. 8 is a front perspective of articulated steering sled with runners completely articulated.
Figure 9:
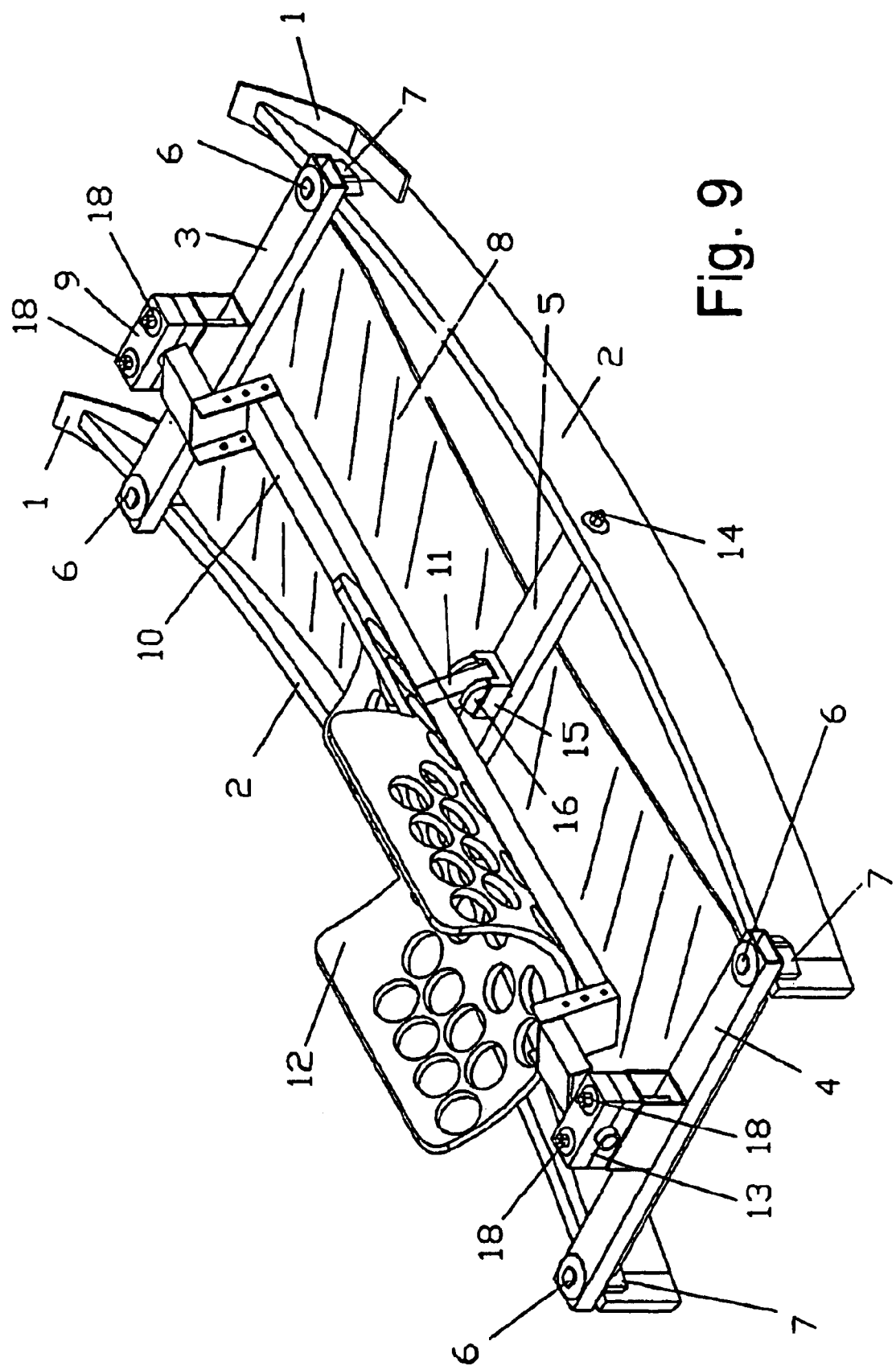
FIG. 9 is a right rear perspective of articulated steering sled with runners completely articulated.

To use the articulated steering sled sit facing forward in seat 12 with feet resting on front cross member 3. Point articulated steering sled down hill and glide. To turn articulated steering sled lean in the direction you wish to turn. Seat 12 tilts in that direction forcing toggle 11 and toggle wheels 16 to move against toggle trunk 15. (FIGS. 8 and 4) The force on toggle trunk 15 causes intermediate cross member 5 to move laterally against both runners 2. Flex in runners 2 is caused by lateral force from intermediate cross member 5. Runners 2 become uniformly bowed as the runner pivots 6 rotate under the front and rear cross members 3, 4. The bow in the runners 2 causes the articulated steering sled to turn in the direction that the rider is leaning. As the runners flex the distance between the front and rear cross members 3, 4 diminishes. Both front journal 9 and rear journal 13 slide forward and backward on central longitudinal member 10 to allow for runner 2 length change as they flex (FIG 5). Longitudinal axle 10 remains held in place by toggle 11 and toggle trunk 15. Speed of the articulated steering sled can be increased by the rider leaning back in seat 12. Speed of the articulated steering sled can be reduced by the rider sitting upright in seat 12 and making a turn or a series of turns across the fall line of the slope.

What is claimed is:

1. A sled comprising:

front and rear cross members;

left and right runners pivotably connected to the front and rear cross members;

a central longitudinal member rotatably connected to the front and rear cross members, and having front, middle and rear portions;

a central cross member connected to the left and right runners and to the central longitudinal member, the central cross member operable to flex the left and right runners responsive to rotation of the central longitudinal member; and, at least one of the front and rear cross members moveable toward the central cross member responsive to flexing of the left and right runners, wherein the front cross member, the rear cross member and the central cross member remain parallel relative to one another during flexing.

2. A sled according to claim 1 further comprising a seat mounted on the central longitudinal member.

3. A sled according to claim 1 wherein the central longitudinal member rotatably connected to the front cross member comprises:

the front cross member including a front journal; and, the front portion of the central longitudinal member rotatably engaged with the front journal.

4. A sled according to claim 1 wherein the central longitudinal member rotatably connected to the rear cross member comprises:

the rear cross member including a rear journal; and, the rear portion of the central longitudinal member rotatably engaged with the rear journal.

5. A sled according to claim 1 further comprising:

a receiver mounted on the central cross member;

the central longitudinal member having a protruding toggle engaged with the receiver, the toggle and receiver operable to move the central cross member laterally responsive to rotation of the central longitudinal member.

6. A sled according to claim 5 wherein the central longitudinal member toggle includes at least one rotatable member engaged with the receiver, and which is operable to rotate responsive to rotation of the central longitudinal member.

7. A sled according to claim 5 wherein the at least one rotatable member includes a pair of wheels engaged with the receiver.

8. A sled according to claim 1 further comprising a bottom plate mounted between the left and right runners.

9. A sled according to claim 1 further comprising each of the left and right runners including a front planing portion.

10. A sled according to claim 3 wherein the front journal slides forward and backward alone the central longitudinal member front portion.

11. A sled according to claim 4 wherein the rear journal slides forward and backward alone the central longitudinal member rear portion.

12. A sled according to claim 3 wherein the central longitudinal member front and rear portions are elevationally offset from the middle portion.

13. A sled according to claim 1 further wherein the left and right runners are formed of a polymeric material.

14. A sled according to claim 12 wherein the axial offset of the central longitudinal member front and rear portions is adjustable.

15. A sled according to claim 1 further comprising front and rear wheels mounted on each of the left and right runners and operable to roll over an underlying surface.

* * * * *